R. LATOUR & A. CAPPELLE.
COVER FOR PNEUMATIC TIRES.
APPLICATION FILED NOV. 11, 1911.
1,149,841.
Patented Aug. 10, 1915.
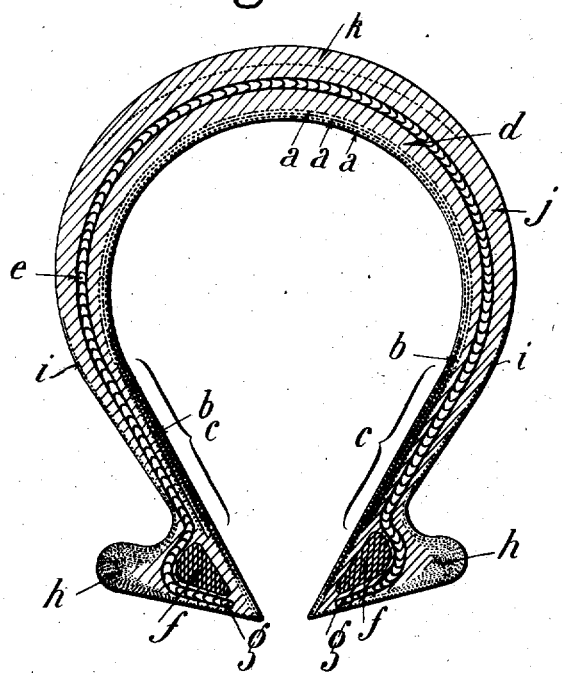
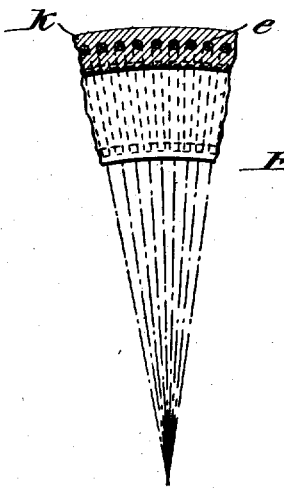

UNITED STATES PATENT OFFICE.

RICHARD LATOUR AND ALBERT CAPPELLE, OF MENIN, BELGIUM.

COVER FOR PNEUMATIC TIRES.

1,149,841.  Specification of Letters Patent.  Patented Aug. 10, 1915.

Application filed November 11, 1911. Serial No. 659,858.

*To all whom it may concern:*

Be it known that we, RICHARD LATOUR and ALBERT CAPPELLE, subjects of the King of Belgium, residing at 157 Chaussée d'Ypres, Menin, Belgium, have invented new and useful Improvements in or Relating to Covers for Pneumatic Tires, for which application has been made in Belgium April 8, 1911; France, July 20, 1911; Switzerland, July 21, 1911; Great Britain, July 21, 1911; Germany, July 25, 1911; Italy, July 31, 1911; Austria, August 3, 1911; and Hungary, August 4, 1911.

This invention relates to a cover for pneumatic tires, the frame work of which consists of several layers of superposed canvas or fabric covered with a layer of cords specially arranged and impregnated with rubber.

Figure 1 shows by way of example one embodiment of our invention in section. Fig. 2 is a cross section through a cord showing the single rubber coated strands. Fig. 3 is a longitudinal section through a fragmentary part of the wheel.

The superposed layers of canvas or fabrics $a$ $a$ $a$ are normally separated from each other by a layer of adhesive solution and a sheet of Pará rubber $b$ $b$ at the part $c$ of the lateral faces where the cover must have a greater elastic flexibility and where it is chiefly exposed to stresses this being done in order to prevent the layers of fabric from becoming detached and rubbing against each other, thus producing a destructive heating bringing about quick breaking of the canvas. The layers of fabric thus connected together by the said intermediate masses of Pará rubber, are subsequently covered with a thicker sheet of Pará rubber $d$ on which is arranged a rubber impregnated cord $e$ which extends from one bead to the other in radial planes. The beads are formed by a hardened rubber core $f$ outside which pass the ends $g$ of the cords, and by a roll of rubber impregnated layers of fabric $h$, the whole being covered with canvas $i$ which rises to the middle of the cover. Finally, a protective rubber layer $j$ and a tread $k$ complete the whole which is vulcanized in the usual manner.

The cords $e$ as shown in Fig. 2 in section are of peculiar structure each of the strands 1 forming the cords being arranged within a rubber tube $m$ by dipping the strands into a solution of Pará rubber and subsequently drying the same. The different strands coated with the rubber are then coated in the usual manner. The rubber coating thus preventing the strands 1 from coming into direct contact with each other. These cords are mechanically stretched, and cannot expand or stretch in the tire. They increase the strength of the canvas layers and prevent the latter from stretching, shifting and becoming cut by continuous deformations during traveling.

The arrangement of cords side by side in radial planes prevents any possibility of contact between the cords which can become deformed only in their radial planes. The result is a light, exceedingly flexible cover which is much stronger than an ordinary fabric cover.

Having now particularly described and ascertained the nature of our invention, we declare that what we claim is:

A pneumatic tire of the character described, comprising in combination, superposed layers of canvas at the inside of the tire, a layer of adhesive solution between each two of said canvas layers for separating them, a strengthening rubber covering for said layers of canvas at the lower part of their inner side faces chiefly exposed to stresses, a thick rubber cover for the combined layers of fabric, rubber impregnated cords surrounding said rubber cover, and hardened rubber core and a roll of rubber impregnated layers forming beads the ends of said cord passing the outside of said core, a canvas cover outside of the other elements and covering them from the head to the middle of the side of the tire, and a protective rubber layer covering all parts and a tread face upon said rubber layer, substantially as described and for the purpose set forth.

In testimony whereof we affix our signatures in presence of two witnesses.

RICHARD LATOUR.
ALBERT CAPPELLE.

Witnesses:
CHARLES ZAIPRET,
CHAS. ROY NASMITLE.